March 6, 1951 L. S. RITHER 2,544,471
DUAL PURPOSE BRAKE MECHANISM
Filed Feb. 11, 1949

INVENTOR.
Lee S. Rither
BY Albert G. McCaleb
Att'y

Patented Mar. 6, 1951

2,544,471

UNITED STATES PATENT OFFICE 2,544,471

DUAL-PURPOSE BRAKE MECHANISM

Lee S. Rither, Chicago Heights, Ill.

Application February 11, 1949, Serial No. 75,774

7 Claims. (Cl. 188—82.8)

This invention relates to a dual purpose brake mechanism having for its dual purposes: (1) to hold a rotatable shaft so as normally to prevent the rotation thereof; and (2) to impart to said shaft, upon each shaft releasing operation of the brake mechanism, an increment of rotational movement in a predetermined direction and of relatively short span.

One of the more general objects of my invention is to provide a brake mechanism adapted to use, for example, with apparatus in which articles are normally retained in a static state and in which the articles, when released are movable by gravitational force or the like, said brake mechanism being utilized to effect the normal retention of the articles and also to provide an initial pulse of movement thereto for overcoming the static friction and initiating the movement of the articles.

As another object, my invention has within its purview the provision of a brake mechanism embodying a brake drum and having a brake shoe element so constructed and disposed for movement relative to the brake drum that the drum is frictionally gripped thereby in one operating position of the shoe and has a limited pulse of rotational movement imparted thereto during movement of the brake shoe from said one operating position.

My invention further comprehends the provision of a brake mechanism wherein a brake shoe, in one operating position, embraces more than 180 degrees of the periphery of a brake drum, and wherein the brake shoe is swingable to and from said operating position about an axis outwardly of the periphery of the drum and is so shaped that a small portion of the tip end thereof remote from said axis swings laterally across a diameter of the drum which in contact therewith for a limited distance after other drum engaging surfaces of the brake shoe have separated therefrom.

In an additional aspect, I have provided in a brake mechanism of the type referred to in the preceding object, a brake shoe having braking surfaces adapted to grip arcuately displaced and opposed portions of the brake drum on the brake shoe side of the drum axis.

More specifically, the invention has within its purview the provision, in brake mechanisms of the class referred to, of a brake drum having a firm, but relatively resilient peripheral surface and a brake shoe presenting a substantially rigid and hard brake drum engaging surface.

Other objects and advantages of the invention will be apparent from the following description and the accompanying drawings in which similar characters of reference indicate similar parts throughout the several views.

Figure 1:
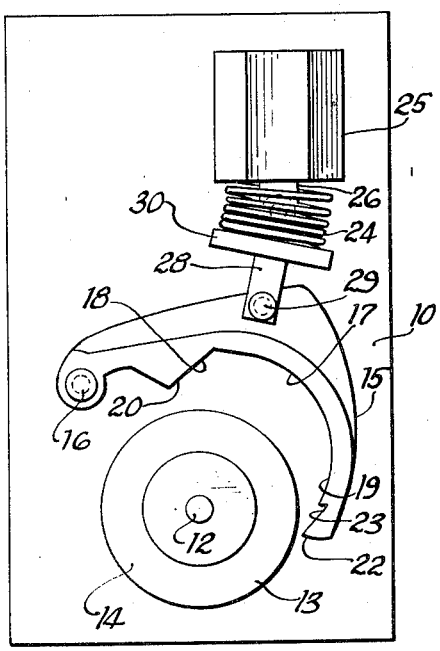
Figure 2:
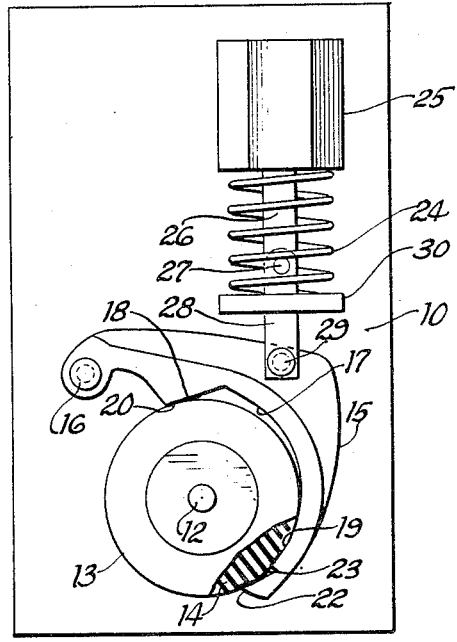

Referring to the one sheet of drawings,

Figs. 1 and 2 are front elevational views of a preferred embodiment of my dual purpose brake mechanism, wherein two different operating positions of the parts are depicted.

In the exemplary embodiment of my invention which is disclosed herein for illustrative purposes, my dual purpose brake mechanism is shown in its assembled relationship on a base plate 10. A shaft 12, through which the brake mechanism coacts with the associated apparatus with which it is used, is supported for rotation relative to the base plate 10 and has a brake drum 13 secured thereto at a position adjacent the base plate. In my preferred structure, the brake drum includes a layer of flexible resilient material 14, such as rubber, secured to the outer surface thereof, so as to provide a braking surface having resilience, as well as a high coefficient of friction.

A brake arm 15 which, in the present instance, is preferably a one piece integrally formed and substantially rigid unit, is supported relative to the base plate 10 and in the general plane of the brake drum 13 for swinging movement toward and from the peripheral surface of the brake drum and about an axis spaced outwardly from that peripheral surface. In the present instance, a pin 16 which has a head thereon and is secured to the base plate 10 provides the support for the brake arm. On the side of the brake arm 15 facing the brake drum 14, and in alignment for engagement with the peripheral surface of the brake drum, the brake arm has a concavely curved surface 17 adjoined by a substantially flat surface 18; the curved and flat surfaces 17 and 18 together being adapted to encompass and overlie a substantial portion of the brake drum periphery when in contact therewith.

As depicted in Fig. 2, and since the disclosed brake mechanism is particularly adapted to the normal retention of a shaft in a fixed or stationary position, as distinguished from applying frictional resistance for the impedance of motion as its principal function, the contours and relative dispositions of the surfaces 17 and 18 provide braking surface portions 19 and 20 respectively which engage the brake drum surface in arcuately separated positions and at a span calculated to exert a gripping action upon the brake drum. The span or separation between the braking surface portions, in my preferred structure, is relatively wide but substantially less than 180 degrees. Such separated braking surfaces, in addition to having the gripping action, as well as the normal frictional resistance to movement of the brake drum, also provide for relatively quick gripping and release of the braking force in respect to the distance of movement of the brake arm. As also depicted in Fig. 2, the curvature of the curved surface 17 is such that between the opposed braking surface portions 19 and 20, there is a separation from the periphery of the brake drum.

In addition to the described braking action, my dual purpose brake mechanism is also adapted to effect actuation of the shaft 12 through a small increment of rotational movement when the brake is released. This type of action is desirable in certain applications such, for example, as in the release mechanism of gravity operated vending machines. In such machines, the articles to be vended are stacked in racks, hoppers or the like, and are normally retained by a trap held in a closed position by the retention of the brake drum and its shaft. In such a machine, the prompt release of an article from the trap and the effective overcoming of static friction are facilitated by initiating movement of the trap, as well as releasing it. With the disclosed dual purpose brake mechanism, the increment of movement imparted to the brake drum and its shaft 12 upon the release of the brake can be utilized for the initiation of the trap movement, or some such purpose.

In the disclosed embodiment of my invention, a tip portion 22 is provided on the end of the brake arm remote from the mounted end of that arm. By preference, that tip portion is segregated from the braking surface portion 19 as, in the present instance, by a notch 23. The disposition of the tip portion 22 with respect to the axis of swinging movement of the brake arm and the axis of rotational movement of the brake drum is such that during the movement of the brake arm to and from the brake applying position, the tip portion crosses a line passing through those axes. In other words, the tip portion 22 moves in somewhat tangential relationship to the brake drum surface across a diameter of the brake drum which, if extended, would pass through the axis of movement of the brake arm. During the limited angle of the movement of the brake arm in which the tip portion 22 crosses the brake drum surface as described, the tip portion 22 is in contact and in firm frictional engagement with the brake drum surface, so as to effect the movement of the brake drum and its shaft therewith. The resilience of the brake drum surface and its accompanying flexibility permits such movements of the brake drum and brake arm about different centers, while maintaining effective frictional contact therebetween for the desired increment of forced brake drum movement.

For effective response of the brake drum movement to the brake releasing motion of the brake arm, it may be observed that it is preferable, particularly for the braking action of the braking surface portion 20, that such braking action shall be quickly and effectively released. Thus, opposition to the provision of the initiating "pulse" of motion to the brake drum shaft is avoided.

Although various actuating mechanisms might be utilized for accomplishing the desired movements of the brake arm, either directly or by remote control, the disclosed dual purpose brake mechanism is normally moved to, and held in a brake applying position by a compression spring 24; the actuation to the released position being effected by a solenoid 25. In more specific detail, the solenoid 25 has an armature 26 which is linearly movable between the positions depicted in Figs. 1 and 2. The exposed end of the armature 26 is hingedly connected by fastening means, such as a rivet 27, to one end of a link 28. The other end of the link 28 is connected through fastening means, such as a rivet 29, to the mid-portion of the brake arm 15. The compression spring 24 is disposed between one end of the solenoid 25 and a flanged disk 30 secured to the mid-portion of the link 28. With this arrangement of parts, the brake is normally applied by, and to the extent of the biasing force of, the compression spring 24. The solenoid, on the other hand, provides the operating force for effecting release of the brake and the imparting of the initial increment of rotational movement to the brake drum shaft 12 as the brake releasing motion of the arm progresses.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A dual purpose brake mechanism adapted normally to hold a shaft stationary and then, upon release, to impart to said shaft a small increment of rotational movement, and comprising, in combination, a brake drum secured to said shaft, a brake arm and shoe element of substantially rigid construction and having a brake shoe portion facing the drum, said brake arm and shoe element being mounted for swinging movement in the general plane of the brake drum so that the brake shoe portion moves about an axis spaced outwardly of the drum periphery toward and from engagement with the said periphery, said brake drum having a layer of resilient friction material secured to the peripheral surface thereof, said brake shoe portion having spaced drum engaging surfaces disposed to provide gripping action against the drum surface when in contact therewith, said brake shoe portion having a tip at the end thereof remote from said axis which is so disposed on said element and with reference to said drum and axis that it laterally crosses a diameter of the drum which is aligned with said axis while in firm frictional contact with the drum surface.

2. A dual purpose brake mechanism as defined in claim 1, and further characterized by resilient means normally biasing the brake shoe portion into engagement with the drum, and a power actuated operating element for effecting release of the brake shoe portion from the drum against the biasing force of said resilient means.

3. A dual purpose brake mechanism as defined in claim 1, and wherein said drum engaging surfaces release the drum before the tip crosses said diameter of the drum during movement of the brake shoe portion away from the drum.

4. A dual purpose brake mechanism adapted normally to hold a shaft stationary and in addition, upon actuation, to impart to said shaft an increment of rotational movement, and comprising, in combination, a brake drum secured to said shaft and having a resilient outer surface, a brake arm of substantially rigid construction and including a drum engaging brake shoe portion, said arm being supported for swinging movement about an axis spaced outwardly from the drum periphery and between preselected brake applying and brake releasing positions such that during movements between said positions a drum engaging element of the arm remote from the axis passes laterally of a line extending through said axis and said shaft while in frictional contact with the resilient outer surface of the drum, and a braking surface on said brake shoe portion in spaced relationship to said drum engaging element of the arm and having brake applying engagement with the outer surface of the drum when said arm is in the brake applying position.

5. A dual purpose brake mechanism as defined in claim 4, and wherein said drum engaging element of the arm moves across said line in frictional contact with the drum surface in sequential relationship to the engagement and disengagement of the brake applying surface with the drum.

6. A dual purpose brake mechanism adapted normally to hold a shaft stationary and then, upon release, to impart to said shaft a small increment of rotational movement, and comprising, in combination, a circular brake drum of preselected diameter secured to said shaft, a one-piece brake arm and shoe element of substantially rigid construction and having a brake shoe portion facing the drum, said brake arm and shoe element being mounted for swinging movement in the general plane of the brake drum so that the brake shoe portion moves toward and from engagement with the periphery of the drum about an axis spaced outwardly from the drum periphery, said brake drum having a layer of resilient friction material secured to the peripheral surface thereof, said brake shoe portion having a drum engaging surface contoured to encompass practically half of the drum surface when in contact therewith, and said brake shoe portion having a tip portion thereon at the end thereof remote from the mounted end of the brake arm and shoe element, said tip portion being disposed on said element and with reference to said drum and axis so as laterally to cross a diameter of the drum which is aligned with said axis and while in firm frictional contact with the drum surface, and said tip portion remaining in contact wth the drum surface to effect a substantial but small increment of rotational movement of the drum after the brake shoe portion of the arm has moved away from the drum.

7. A dual purpose brake mechanism adapted normally to hold a shaft stationary and then, upon release, to impart to said shaft a small increment of rotational movement, and comprising, in combination, a circular brake drum of preselected diameter secured to said shaft, a one-piece brake arm and shoe element of substantially rigid construction and having a brake shoe portion facing the drum, said brake arm and shoe element being mounted for swinging movement in the general plane of the brake drum so that the brake shoe portion moves toward and from engagement with periphery of the drum about an axis spaced outwardly from the drum periphery, said brake drum having a layer of resilient friction material secured to the peripheral surface thereof, said brake shoe portion having a drum engaging surface contoured to encompass practically half of the drum surface when in contact therewith, and said brake shoe portion having a tip portion thereon at the end thereof remote from the mounted end of the brake arm and shoe element, said tip portion being disposed on said element and with reference to said drum and axis so as laterally to cross a diameter of the drum which is aligned with said axis and while in firm frictional contact with the drum surface, and said drum engaging surface having drum gripping portions spaced arcuately of the drum surface which are disposed to exert a gripping action thereon when in contact therewith, said drum gripping portions also being disposed to effect release of the drum prior to the disengagement of the tip portion therefrom as the arm moves away from the drum.

LEE S. RITHER.

REFERENCES CITED

The following references are of record in the file of this patent:

UNITED STATES PATENTS

| Number | Name | Date |
| --- | --- | --- |
| 1,137,329 | Johnson | Apr. 27, 1915 |
| 1,886,169 | Cornwall | Nov. 15, 1938 |
| 2,137,111 | Hale et al. | Nov. 15, 1938 |